Figure 1:
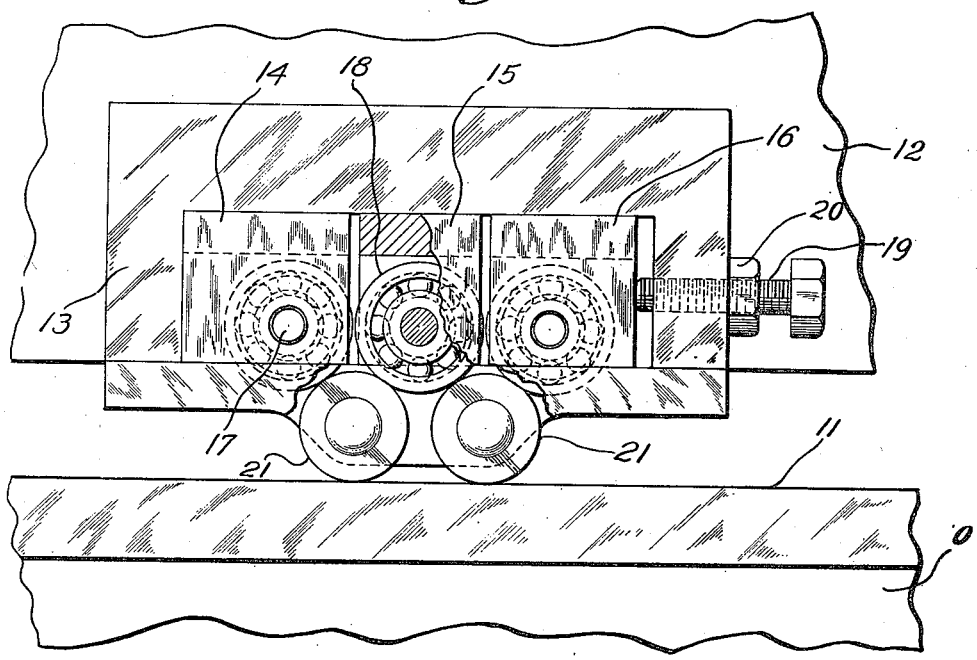

June 3, 1941.   J. C. SHAW   2,244,434
SUPPORTING ROLLER BEARING
Filed Sept. 1, 1939

INVENTOR
J. C. Shaw
BY Joseph K. Schofield
ATTORNEY

Patented June 3, 1941

2,244,434

UNITED STATES PATENT OFFICE 2,244,434

SUPPORTING ROLLER BEARING

John C. Shaw, Hartford, Conn., assignor to Niles-Bement-Pond Company, Hartford, Conn., a corporation of New Jersey Application September 1, 1939, Serial No. 292,975

4 Claims. (Cl. 308—6)

This invention relates to anti-friction supporting bearings and particularly to a supporting bearing for a machine tool slide or column movable on a horizontal plane base surface.

An object of the invention is to provide an anti-friction form of bearing for a heavy movable member such as the column or slide of a machine tool to enable the member to be easily moved to predetermined positions or variable small distances.

Another object of the invention is to provide a bearing that will be self-aligning vertically, the bearing preferably having a pair of parallel rollers supported and housed within the movable member in a manner to equalize their loads and resting upon the base surface upon which the movable member is supported and moved.

A feature of importance of the invention is that there are two or more cylindrical rollers within the bearing, preferably having rounded projections at their opposite ends, these rollers being housed within the lower portion of the movable member and so disposed that their lower portions may engage the bearing surface of the base, there being anti-friction means to adjustably support the bearings so that they can adapt themselves to varying positions of the rollers due to inequalities of the base surface.

Another feature of advantage is that the means for supporting the cylindrical rollers, which means also are adapted to hold them in parallelism, comprise pairs of anti-friction bearings such as a standard form of ball bearing, the outer peripheries of which contact different portions of the upper surfaces of the rollers, and the inner races of the anti-friction bearings are supported on transverse shafts in blocks adjustable laterally within the movable member.

And finally it is an object of the invention to provide a supporting bearing of the above described type, adjustment of the members of which will slightly vary the vertical adjustment of the supported slidable member.

With the above and other objects in view, the invention may include the features of construction and operation set forth in the following specification and illustrated in the accompanying drawing.

In the accompanying drawing annexed hereto and forming a part of this specification, I have shown the invention embodied in and adapted for application to the column of a movable column type machine tool, but it will be understood that the invention can be otherwise embodied and that the drawing is not to be construed as defining or limiting the scope of the invention, the claims appended to this specification being relied upon for that purpose.

Figure 2:
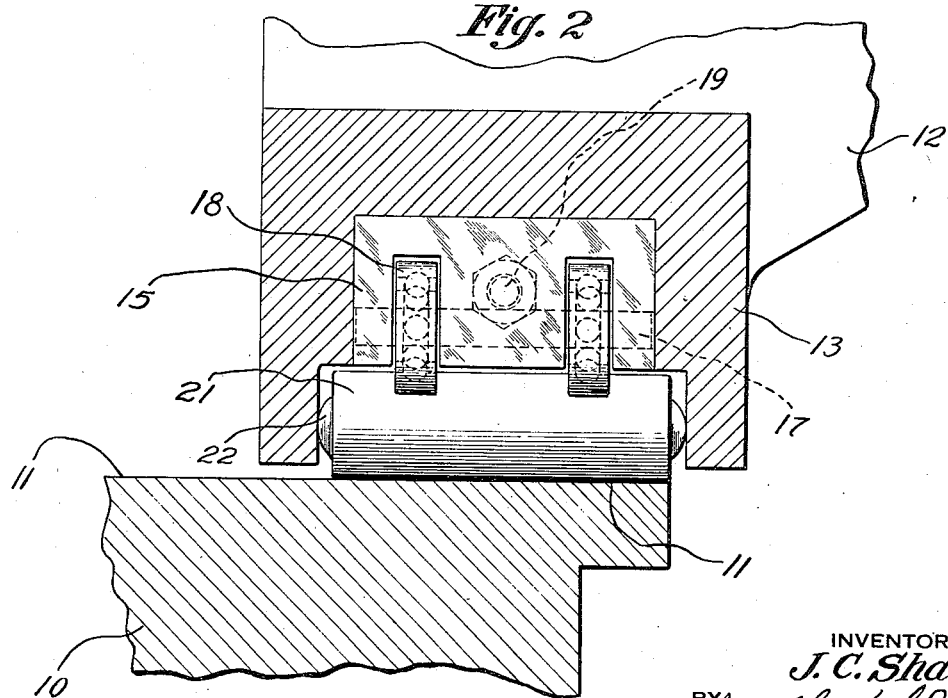

In the drawing:

Figure 1 is a fragmentary front elevation of a base and movable column and showing a complete supporting bearing for one side or end of the column, a part of the housing for the bearing being broken away to more clearly show its construction, and Fig. 2 is a sectional view taken transversely of the column and showing a side elevation of the bearing.

In the above mentioned drawing there has been illustrated but one embodiment of the invention which is now deemed preferable, but it is to be understood that changes and modifications may be made within the scope of the appended claims without departing from the spirit of the invention.

Briefly and in its broadest aspect, the invention may include the following principal parts: First, a column or other heavy movable member adapted for slidable or other movement along a bearing surface on a base; second, a housing formed within a portion of the member; third, blocks mounted within said housing and having spaced anti-friction bearings mounted therein for rotation upon their inner races; fourth, a pair of cylindrical rollers each of which engages the anti-friction bearings mounted within two adjacent blocks; and fifth, adjustable positioning means for said blocks.

Referring more in detail to the figures of the drawing, there is shown fragmentarily a section of a base 10 having a plane horizontal bearing surface 11 over which a movable member 12 may slide or be adjusted by any usual means not shown. The movable member 12 shown fragmentarily is provided with a housing portion 13 adjacent its lower surface, this housing preferably having a rectangular opening therein. Housed within the opening are blocks 14—15 and 16, each block mounting a transverse shaft 17 upon which are mounted in spaced apart relation anti-friction bearings 18. It will be seen that the transverse shaft 17 in each of the blocks 14—15 and 16 extends completely across its block and that the anti-friction bearings 18 thereon extend within suitable openings provided within the blocks. The shafts 17 to support their bearings 18 engage the inner rings of these anti-friction bearings.

As shown in Fig. 1, three blocks 14—15 and 16 are provided, one of which, namely block 14, is adapted to abut against an end wall of the recess within the housing 12 and the opposite block, namely block 16, is adjustable a slight distance longitudinally within the recess of this housing 13. In order to adjust this block 16 a screw 19 may be provided extending through the outer surface of the housing 13 and provided with a check nut 20 to secure the screw in any adjusted position.

Disposed freely within the lower portion of this recess are parallel cylindrical rollers 21. These rollers 21 engage the flat surface 11 of the base 10 over which the movable member 12 is adjustable or movable and are held in spaced parallel position by their engagement with the outer races of the anti-friction bearings 18 referred to above. It will be seen that each cylindrical roller 21 engages two pairs of bearings 18. One pair is axially disposed in one block and the other pair is axially disposed to each other in another block. The center block contains a centrally disposed pair of anti-friction bearings in axial alignment with each other and this pair engages portions of both cylindrical rollers.

By adjustment of the block 16 by means of the screw 19, the elevation of the movable member 12 can be slightly adjusted and that for different adjustments of the block 16 the central block 15 will be free to laterally adjust itself for engagement with the pair of cylindrical rollers 21 and retain them in spaced and parallel relation to each other.

To prevent endwise movement of the rollers 21, central projections 22 may be formed on their opposite ends as shown in Fig. 2. These projections contact the lower side flanges of the housing 13 and permit free rotation of rollers 21 with minimum friction.

Inequalities of the bearing surface 11 of the base 10 cause the rollers 21 to adjust themselves so that both always are in contact with the surface. The anti-friction bearings 18 will correspondingly adjust themselves to bear upon the upper portions of the rollers 21 with equal pressure. For this purpose the blocks 14—15 and 16 in which the anti-friction bearings are mounted adjust themselves laterally. In different positions of the rollers 21 the anti-friction bearings 18 support them in intermediate positions with the load of the slidable member 12 equally divided between the rollers 21. Also the intermediate block 15 can adjust itself to a position to bear equally upon the two rollers 21.

I claim:

1. A supporting bearing for a movable member comprising in combination, a base having a plane bearing surface, a member movable thereover, rollers retained within said movable member and engaging the bearing surface of said base, and rollers engaging and retaining said first mentioned rollers in position, said last mentioned rollers being axially supported for rotation upon shafts adjustable laterally within said movable member.

2. A supporting bearing for a movable member comprising in combination, a base having a plane bearing surface, a member movable thereover, rollers laterally adjustable within said movable member and engaging the bearing surface of said base, and individually mounted rollers engaging and retaining said first mentioned rollers in position, said last mentioned rollers being rotatably mounted within blocks laterally adjustable within said movable member.

3. A supporting bearing for a movable member comprising in combination, a base having a plane bearing surface, a member movable thereover, rollers housed within said slidable member in position to engage the bearing surface of said base, said rollers being freely adjustable toward and from each other, blocks disposed within said movable member and having rollers mounted for free rotation upon shafts mounted within said blocks, and means to retain said blocks in predetermined positions.

4. A supporting bearing for a movable member comprising in combination, a base member having a plane bearing surface, a member movable thereover, a pair of parallel rollers housed within said movable member in positions to engage the bearing surface of said base, said rollers being freely adjustable toward and from each other, three blocks laterally adjustable within said movable member each block supporting a pair of spaced anti-friction rollers in axial alignment with each other, said last mentioned rollers bearing upon said first mentioned rollers and serving as their positioning means, and means to adjust said blocks to different predetermined positions.

JOHN C. SHAW.